US012567136B2

(12) United States Patent
    Kang et al.

(10) Patent No.:     US 12,567,136 B2
(45) Date of Patent:        Mar. 3, 2026

(54) METHOD AND APPARATUS FOR INSPECTING VEHICLE

(71) Applicants:HYUNDAI MOTOR COMPANY, Seoul (KR); KIA CORPORATION, Seoul (KR)

(72) Inventors: Chan Jin Kang, Seoul (KR); Minhoe Hur, Seoul (KR); Jaesik Min, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 405 days.

(21) Appl. No.: 18/136,960

(22) Filed: Apr. 20, 2023

(65) Prior Publication Data

US 2023/0342905 A1     Oct. 26, 2023

(30) Foreign Application Priority Data

Apr. 21, 2022    (KR) ......................... 10-2022-0049381

(51) Int. Cl.
    G06T 7/00          (2017.01)
    G06T 7/70          (2017.01)
(52) U.S. Cl.
    CPC .............. G06T 7/0004 (2013.01); G06T 7/70 (2017.01); *G06T 2207/10024* (2013.01);
        (Continued)
(58) Field of Classification Search
    CPC ..................... G06T 7/0004; G06T 7/70; G06T 2207/10024; G06T 2207/20081; G06T 2207/20084; G06T 2207/30252; G06T 7/001; G06T 5/20; B62D 65/005; G06N 3/045; G06N 3/0475; G06N 3/088; G06N 3/094

See application file for complete search history.

(56) References Cited

U.S. PATENT DOCUMENTS 7,873,936 B2     1/2011   Cranmer et al.
8,645,875 B2     2/2014   Cranmer et al.
           (Continued)

FOREIGN PATENT DOCUMENTS

CN        110796174       *  2/2020
CN        114092462       *  11/2021
           (Continued)

OTHER PUBLICATIONS

Machine translation for CN 110796174 (Year: 2020).*
Machine translation for CN 113822840 (Year: 2021).*
Machine translation for CN 114092462 (Year: 2021).*

*Primary Examiner* — Qian Yang
(74) *Attorney, Agent, or Firm* — Morgan, Lewis & Bockius LLP

(57)            ABSTRACT

An apparatus and method for inspecting a vehicle include photographing a lower side of a vehicle to obtain a lower side image, transmitting the lower image to a server, receiving inspection result data of the lower side of the vehicle from the server, and displaying the inspection result data on a display, wherein the received inspection result data includes a result obtained by generating a defect image of the lower side of the vehicle from a virtual image, in which a defect is indicated, of a reference lower image of the vehicle, and determine whether the lower side of the vehicle is defective using the generated defect image.

35 Claims, 11 Drawing Sheets

(52) U.S. Cl.
CPC .............. *G06T 2207/20081* (2013.01); *G06T 2207/20084* (2013.01); *G06T 2207/30252* (2013.01)

(56) References Cited

U.S. PATENT DOCUMENTS

| | | | | |
|---|---|---|---|---|
| 10,599,951 | B2 | 3/2020 | Bhaskar et al. | |
| 10,726,535 | B2 | 7/2020 | Chung et al. | |
| 10,810,733 | B2 | 10/2020 | Kondo et al. | |
| 2021/0158570 | A1* | 5/2021 | Mohandoss | G06V 20/48 |
| 2021/0272273 | A1 | 9/2021 | Brauer | |

FOREIGN PATENT DOCUMENTS

| | | | |
|---|---|---|---|
| CN | 113822840 | * | 12/2021 |
| JP | 2019046390 | A | 3/2019 |
| JP | 2020027424 | A | 2/2020 |
| JP | 2021012108 | A | 2/2021 |
| JP | 20211120631 | A | 8/2021 |
| KR | 10-2225099 | B1 | 3/2021 |
| KR | 10-2021-0041155 | A | 4/2021 |
| KR | 10-2021-0081077 | A | 7/2021 |

* cited by examiner

INPUT VIRTUAL IMAGE OUTPUT
FROM GENERATOR INTO
SECOND LEARNING MODEL
— 1200

LEARN, BY SECOND LEARNING MODEL,
IMAGE HAVING WATER LEAK OR OIL
LEAK IN LOWER SIDE OF VEHICLE
— 1210

DETERMINE WHETHER LOWER SIDE OF
VEHICLE IS DEFECTIVE USING TRAINED
SECOND LEARNING MODEL
— 1220

END

METHOD AND APPARATUS FOR INSPECTING VEHICLE

CROSS-REFERENCE TO RELATED APPLICATION

The present application claims priority to Korean Patent Application No. 10-2022-0049381, filed on Apr. 21, 2022, the entire contents of which is incorporated herein for all purposes by this reference.

BACKGROUND OF THE PRESENT DISCLOSURE

Field of the Present Disclosure

The present disclosure relates to a vehicle and a control method thereof, and more specifically, to a method and apparatus of inspecting a vehicle for identifying whether there is an abnormality in a lower side of the vehicle.

Description of Related Art

In general, a vehicle is assembled at a vehicle assembly plant, and in an ignition-on state, tested for driving performance, braking performance, exhaust performance, and operations of electric parts, and then visually inspected for the condition of parts, engine, transmission, and water leak or oil leak from below of the vehicle.

However, when the inspection of the lower side of the vehicle is visually performed, the operator needs to maintain a posture looking up from the lower side of the vehicle for a long time, which may cause diseases to the operator.

Accordingly, a technology for inspecting the lower side of a vehicle using artificial intelligence (AI) is being studied, but the defect rate in the lower side of a vehicle is very low with the development of vehicle manufacturing technology, so there is significant insufficiency of training data of an AI model for detecting defects on the lower side of vehicles.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a method and apparatus of inspecting a vehicle that are configured for preventing a side effect from occurring due to using manpower for vehicle inspection and also facilitating efficient inspection, by use of an artificial intelligence (AI) model for inspecting a defect on a lower side of a vehicle, even when there is a difficulty in training an AI model with a low rate of defects on the lower side of the vehicle.

The technical objectives of the present disclosure are not limited to the above, and other objectives may become apparent to those of ordinary skill in the art based on the following descriptions.

According to an aspect of the present disclosure, there is provided a method of inspecting a vehicle, the method including: photographing a lower side of the vehicle to obtain a lower side image of the vehicle; transmitting the obtained lower side image to a server; receiving inspection result data of the lower side of the vehicle from the server;

and displaying the inspection result data on a display, wherein the received inspection result data includes a result obtained by generating a defect image of the lower side of the vehicle from a virtual image, in which a defect is indicated, of a reference lower image of the vehicle, and determine whether the lower side of the vehicle is defective using the generated defect image.

The inspection result data may include a result obtained by: constructing a first learning model for generating a plurality of defect images using the virtual image and a reference defect image as an input value thereof; constructing a second learning model for determining whether the lower side of the vehicle is defective using the plurality of defect images from the first learning model as an input value thereof; and determining whether the lower side of the vehicle is defective using the second learning model.

The constructing of the first learning model may include using a masking image as an input value thereof in addition to the virtual image and the reference defect image, to construct the first learning model so that the plurality of defect images are generated.

The method may further include synthesizing the reference lower image with an output value output from the first learning model using the virtual image, the reference defect image, and the masking image as an input value thereof, to correct the plurality of defect images.

The reference lower image synthesized with the output value may include an RGB image, which is an original image of the lower side of the vehicle.

The first learning model may include a generative adversarial network (GAN), and the constructing of the first learning model may include inputting the virtual image to a generator and inputting the reference defect image to a discriminator, to construct the first learning model so that the plurality of defect images are generated.

The generating of the plurality of defect images may include deforming, by the generator, the virtual image based on an error between the virtual image output from the generator and the reference defect image input to the discriminator, to generate the plurality of defect images.

The generating of the plurality of defect images may include deforming, by the generator, the virtual image so that the error decreases, to generate the plurality of defect images.

The constructing of the second learning model may include, based on the error being less than or equal to a preset criterion, constructing the second learning model using a defect image generated by the generator as an input value of the second learning model.

The determining of whether the lower side of the vehicle is defective may include inputting a photographed lower image of the vehicle to the constructed second learning model, and determining whether the lower side of the vehicle is defective based on an output of the constructed second learning model.

According to an aspect of the present disclosure, there is provided an apparatus of inspecting a vehicle, the apparatus including: a communicator; a camera configured to photograph a lower side of the vehicle; a display; and at least one processor configured to receive inspection result data including whether the lower side of the vehicle is defective from the server and display the inspection result data on the display, wherein the received inspection result data includes a result obtained by generating a defect image from a virtual image, in which a defect is indicated, of a reference lower image of the vehicle, and determine whether the lower side of the vehicle is defective using the generated defect image.

The received inspection result data may include a result obtained by: constructing a first learning model for generating a plurality of defect images using the virtual image and a reference defect image as an input value thereof; constructing a second learning model for determining whether the lower side of the vehicle is defective and determining whether the lower side of the vehicle is defective using the second learning model.

The first learning model may be constructed by use of a masking image as an input value thereof in addition to the virtual image and the reference defect image, to generate the plurality of defect images.

The plurality of defect images may be corrected by synthesizing the reference lower image with an output value output from the first learning model using the virtual image, the reference defect image, and the masking image as an input value thereof.

The reference lower image synthesized with the output value may include an RGB image, which is an original image of the lower side of the vehicle.

The first learning model may include a generative adversarial network (GAN), and the first learning model may be constructed by inputting the virtual image to a generator and inputting the reference defect image to a discriminator, to generate the plurality of defect images.

The plurality of defect images may be generated by controlling the generator to deform the virtual image based on an error between the virtual image output from the generator and the reference defect image input to the discriminator.

The plurality of defect images may be generated by allowing the generator to deform the virtual image so that the error decreases.

The second learning model may be constructed using a virtual image generated by the generator as an input value of the second learning model based on the error being less than or equal to a preset criterion.

The inspection result data may be obtained by inputting a lower image of the vehicle photographed by the camera to the constructed second learning model, and determining whether the lower side of the vehicle is defective based on an output of the constructed second learning model.

According to an aspect of the present disclosure, there is provided an electronic apparatus including: a communicator; a memory; and at least one processor configured to generate inspection result data by generating a defect image from a virtual image, in which a defect is indicated, of a reference lower image of a vehicle and determining whether a lower side of the vehicle is defective using the generated defect image.

The at least one processor may be configured to: construct a first learning model for generating a plurality of defect images using the virtual image and a reference defect image as an input value thereof; construct a second learning model for determining whether the lower side of the vehicle is defective using the plurality of defect images from the first learning model as an input value thereof; and determine whether the lower side of the vehicle is defective using the second learning model.

The at least one processor may be configured to construct the first learning model by use of a masking image as an input value thereof in addition to the virtual image and the reference defect image, to generate the plurality of defect images.

The at least one processor may be configured to correct the plurality of defect images by synthesizing the reference lower image with an output value output from the first learning model using the virtual image, the reference defect image, and the masking image as an input value thereof.

The reference lower image synthesized with the output value may include an RGB image, which is an original image of the lower side of the vehicle.

The first learning model may include a generative adversarial network (GAN), and the at least one processor is configured to generate the plurality of defect images by inputting the virtual image to a generator and inputting the reference defect image to a discriminator.

The at least one processor is configured to generate the plurality of defect images by controlling the generator to deform the virtual image based on an error between the virtual image output from the generator and the reference defect image input to the discriminator.

The at least processor is configured to generate the plurality of defect images by controlling the generator to deform the virtual image so that the error decreases.

The at least one processor may construct the second learning model using a virtual image generated by the generator as an input value of the second learning model based on the error being less than or equal to a preset criterion.

The at least one processor may input a lower image of the vehicle to the constructed second learning model, and determines whether the lower side of the vehicle is defective based on an output of the constructed second learning model.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 4 is a detailed diagram illustrating a first learning model in an apparatus of inspecting a vehicle according to an exemplary embodiment of the present disclosure;

Figure 1:
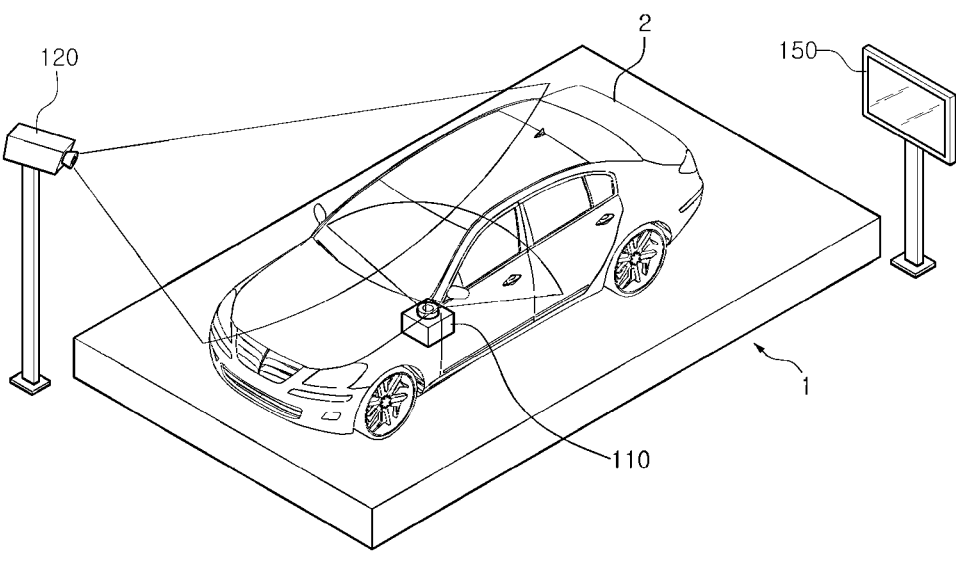
FIG. 1 is a view exemplarily illustrating an exterior of an apparatus of inspecting a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Figure 2:
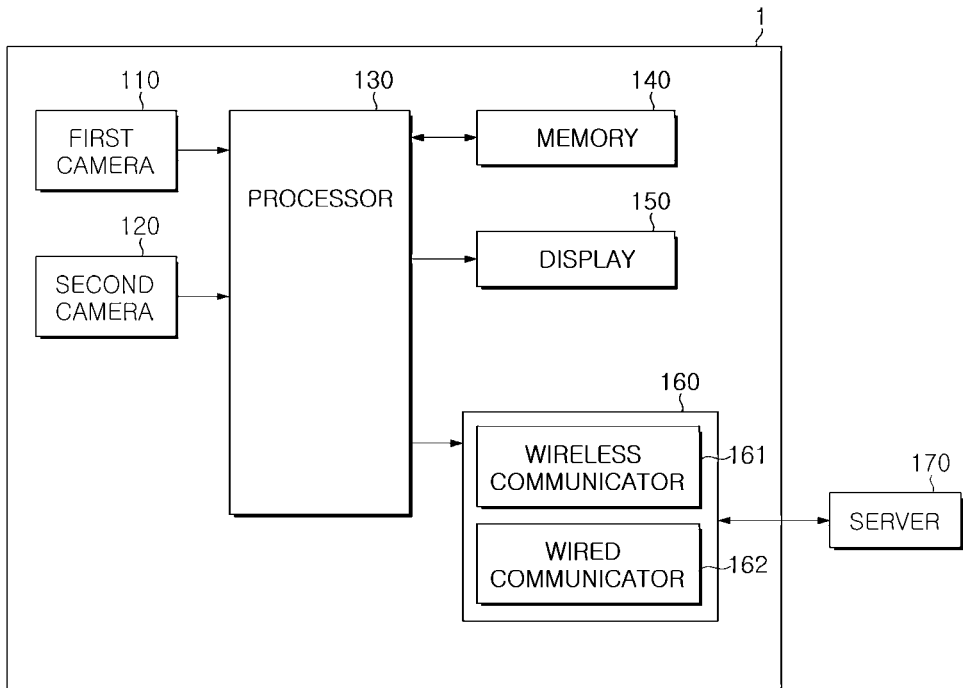
FIG. 2 is a control block diagram illustrating an apparatus of inspecting a vehicle according to an exemplary embodiment of the present disclosure.

FIG. 1 is a view exemplarily illustrating an exterior of an apparatus 1 for inspecting a vehicle 2 according to an exemplary embodiment of the present disclosure, and FIG. 2 is a control block diagram illustrating an apparatus 1 for inspecting a vehicle 2 according to an exemplary embodiment of the present disclosure.

Referring to FIG. 1 and FIG. 2 together, the apparatus 1 for inspecting the vehicle 2 includes a first camera 110, a second camera 120, a memory 140, a display 150, a communicator 160, and a processor 130 for controlling components described above.

The first camera 110 may obtain a lower image 301 of the vehicle 2. The first camera 110 captures the lower side of the vehicle 2 to obtain image information related to the condition of portions of the lower side of the vehicle 2, the engine condition, the transmission, whether there is an oil leak or water leak of the air conditioner, etc., of the vehicle 2.

The first camera 110 may be provided at any position of the apparatus 1 for inspecting the vehicle 2 as long as it is a position capable of obtaining the lower image 301 of the vehicle 2.

The first camera 110 may transmit the obtained lower side image 301 of the vehicle 2 to the processor 130.

A reference lower image 400 of the vehicle 2 may be a lower image 301 of the vehicle 2 which is configured as a reference when the processor 130 analyzes the obtained lower side image 301 of the vehicle 2.

The reference lower image 400 of the vehicle 2 may include a plurality of reference lower images. Furthermore, the reference lower image 400 of the vehicle 2 may be previously stored in the memory 140.

The second camera 120 may obtain an external image of the vehicle 2. The second camera 120 may be provided at any position of the apparatus 1 for inspecting the vehicle 2 as long as it is a position capable of obtaining an external image of the vehicle 2.

The second camera 120 may transmit the obtained external image of the vehicle 2 to the processor 130.

The memory 140 may store a program for performing the above-described operations and operation to be described below, and the processor 130 may execute the stored program. When the memory 140 and the processor 130 are plural, the plurality of memories 140 and the plurality of processors 130 may be integrated into a single chip or may be provided in physically separate locations. The memory 140 may include a volatile memory 140 for temporarily storing data, such as a static random access memory (S-RAM) or a dynamic random access memory (D-RAM). Furthermore, the memory 140 may include a non-volatile memory 140 for storing control programs and control data for a long time period, such as Read Only Memory (ROM), an erasable programmable read only memory (EPROM), and an electrically erasable programmable read only memory (EEPROM). The processor 130 may include various logic circuits and arithmetic circuits, and process data according to a program provided from the memory 140, and generate a control signal according to a result of the processing.

The display 150 may provide a user with various types of information through images. That is, the display 150 may visually provide information related to an inspection result of a lower side of the vehicle 2. For example, the processor 130 may, upon determining that a water leak or oil leak occurs in the lower side of the vehicle 2, display that there is a water leak or oil leak in the lower side of the vehicle 2 on the screen.

The communicator 160 may be controlled by the processor 130, may communicate wirelessly with a server 170, transmit a lower image of the vehicle 2 to the server 170, and receive inspection result data from the server 170.

The communicator 160 may communicate with the server 170 through a wireless communication base station.

As an example of the communication method, the communicator 160 may employ the second generation (2G) communication method, such as Time Division Multiple Access (TDMA) and Code Division Multiple Access (CDMA), the third generation (3G) communication method, such as a Wideband Code Division Multiple Access (WCDMA), Code Division Multiple Access 2000 (CDMA2000), Wireless Broadband (Wibro), and Worldwide Interoperability for Microwave Access (WiMAX), and the fourth generation (4G) communication method, such as Long Term Evolution (LTE) and WiBro Evolution. The communicator 160 may also employ the fifth generation (5G) communication method.

The communicator 160 may include one or more components that enable communication with the server 170, and may include, for example, at least one of a short-range communication module, a wired communicator 162, and a wireless communicator 161.

The short-range communication module may include various short-range communication modules that transmit and receive signals using a wireless communication network in a short range, such as a Bluetooth module, an infrared communication module, a radio frequency identification (RFID) communication module, a wireless local access network (WLAN) communication module, an NFC communication module, and a zigbee communication module.

The wired communicator 162 may include various wired communicators 162, such as a controller area network (CAN) communication module, a local area network (LAN) module, a wide area network (WAN) module, or a value added network communication (VAN) module, and may also include various cable communication modules, such as a universal serial bus (USB) module, a high definition multimedia interface (HDMI) module, a digital visual interface (DVI) module, a recommended standard-232 (RS-232) module, a power line communication module, or a plain old telephone service (POTS) module.

The wireless communicator 161 may include Radio Data System-Traffic Message Channel (RDS-TMC), Digital Multimedia Broadcasting (DMB), Wi-Fi module, Wi-Bro module, and may also include a wireless communicator 161 that supports a global System for Mobile Communication (GSM), CDMA, WCDMA, universal mobile telecommunications system (UMTS), TDMA, LTE, etc.

The wireless communicator 161 may include a wireless communication interface including an antenna and a receiver for receiving the inspection result data from the server 170.

The processor 130 for controlling the above-described components may transmit the lower image 301 of the vehicle 2 obtained by the first camera 110 to an electronic apparatus by a procedure to be described below, and receive inspection result data learned through deep learning in the electronic apparatus and display the inspection result data on the display 150.

The processor 130 may store the inspection result data, which is information related to whether the vehicle 2 is defective, in the memory 140. Furthermore, the processor 130 may control the display 150 to display the inspection result data of the vehicle 2.

The processor 130 may analyze the lower image 301 of the vehicle 2 through a machine learning method to determine whether there is a defect, and generate inspection result data.

Machine learning refers to using a model including a plurality of parameters and optimizing the parameters with provided data. Machine learning may include supervised learning, unsupervised learning, and reinforcement learning in accordance with the type of problems to be learned.

Supervised learning may refer to learning the mapping between an input and an output, and may be used when a pair of an input and an output is provided as data. Unsupervised learning may be used when there is only an input without an output, in which regularity between inputs are found.

The processor 130 may recognize an object through a deep learning method as well as a machine learning method, and may recognize an object in various ways.

The processor 130 may construct a first learning model 200 and a second learning model 300 based on the reference lower image 400 of the vehicle 2. Here, the first learning model 200 may be constructed using a virtual image 410, a reference defect image 420, and a masking image 440 as input values, and the second learning model 300 may be constructed using a defect image 430 generated by a generator 210 as an input value of the second learning model 300.

On the other hand, the lower image 400 may differ by each type of the vehicle 2, and the learning model may also differ by reference lower image data of various types of vehicles learned by the learning model. Accordingly, there may be a plurality of learning models, and a learning model corresponding to each type of the vehicle 2 may be different.

The processor 130 may determine the vehicle type of the vehicle 2 based on an external image of the vehicle 2. In the instant case, information related to the vehicle type may be stored in the memory 140.

That is, the processor 130 may determine image information of the vehicle 2 corresponding to an obtained external image of the vehicle 2 in the memory 140, and determine a vehicle type corresponding to the determined image information of the vehicle 2 as the vehicle type of the vehicle 2.

The processor 130 may determine a single learning model corresponding thereto from among a plurality of learning models based on the determined vehicle type of the vehicle 2.

The processor 130 for performing the above-described operations or operations to be described below may be implemented by at least one memory 140 for storing data regarding an algorithm for controlling the operations of the components of the apparatus 1 for inspecting the vehicle 2 or a program that represents the algorithm, and may perform the above-described operations using data stored in the at least one memory 140.

Hereinafter, a process of determining whether the lower side of the vehicle 2 is defective by the above-described components will be described in detail.

Figure 3:
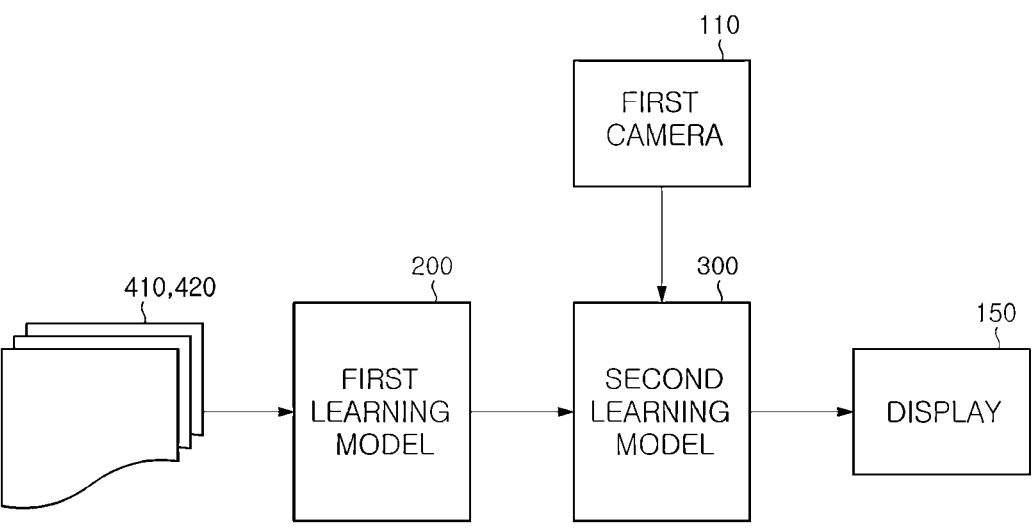
FIG. 3 is a diagram illustrating a relationship between a first learning model and a second learning model of an apparatus of inspecting a vehicle according to an exemplary embodiment of the present disclosure.

FIG. 3 is a diagram illustrating a relationship between a first learning model 200 and a second learning model 300 of an apparatus 1 for inspecting a vehicle 2 according to an exemplary embodiment of the present disclosure.

Referring to FIG. 3, the first learning model 200 and the second learning model 300 may be constructed in an electronic apparatus, such as a server 170. To the present end, the first learning model 200 may be trained through a virtual image 410 and a reference defect image 420, and an output value of the first learning model 200 may be used as an input value of the second learning model 300.

In the instant case, the input value of the second learning model 300 may be provided using a defect image 430 generated by the generator 210, based on an error between the virtual image 410 output from the generator 210 of the first learning model 200 and the reference defect images 420 input to the discriminator 220 being less than or equal to a preset reference The processor 130 may control the first camera 110 to photograph the lower side of the vehicle 2, and transmit the photographed lower image of the vehicle 2 to the server 170. In the instant case, the server 170 may input the lower image to the pre-constructed second learning model 300, and based on an output of the second learning model 300, determine whether the lower side of the vehicle 2 is defective.

The server 170 may transmit, to the apparatus 1 for inspecting the vehicle 2 according to an exemplary embodiment of the present disclosure, an inspection result data determining whether the lower side of the vehicle is defective, and the processor 130 may control the display 150 to display the inspection result data on the display 150.

Figure 4:
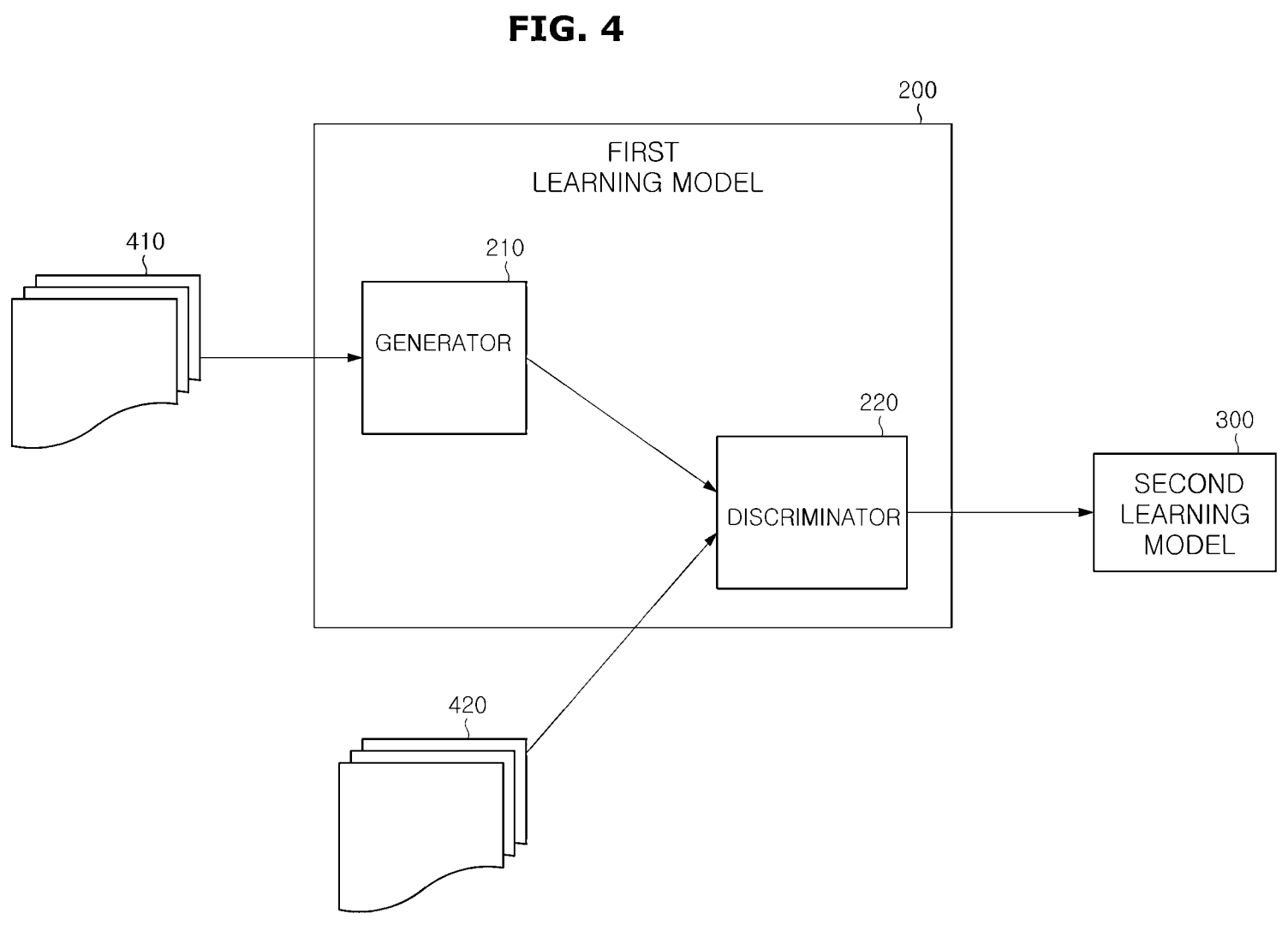

Referring to FIG. 4, a detailed configuration of a first learning model 200 is described.

FIG. 4 is a detailed diagram illustrating a first learning model 200 in an apparatus 1 for inspecting a vehicle 2 according to an exemplary embodiment of the present disclosure.

The first learning model 200 may be an artificial intelligence (AI) model for generating training data of an artificial neural network, and to train an image recognition model based on an artificial neural network, the model is generally trained using training data including a normal image and a defect image 430 so that the accuracy of recognition may be improved.

However, although it is easy to collect various training data of normal images, it is difficult to obtain various training data of defect images 430 (an image which is not completely different but partially includes errors different from a normal image).

To solve the limitations, a method in which a person manually generates a defect image 430 based on a normal image may be used, but in the instant case, the efficiency is significantly lowered in terms of time and cost.

Therefore, to solve the limitation, a method of inspecting a vehicle 2 according to various exemplary embodiments of the present disclosure may generate a defect image 430 through a GAN model.

In a GAN model, GAN is an abbreviation of 'Generative Adversarial Network', and a GAN model may refer to a generation model using an artificial neural network, that is, a model that generates a plausible fake using a generation model.

Furthermore, the second word in GAN, 'Adversarial', represents that GAN develops two models by adversarial competition. As when counterfeiters gradually develop counterfeiting technology to deceive the police, and the police gradually develop the skills to find counterfeit money to catch counterfeiters in an adversarial rivalry between counterfeiters and the police, GAN may train the generator 210 corresponding to the counterfeiters and the discriminator 220 corresponding to the police in an adversarial manner over time.

Here, the generator 210 is provided to deceive the discriminator 220 by generating plausible fake data, and the discriminator 220 is provided to distinguish the fake data generated by the generator 210 from real data, and the training of the generator 210 and the discriminator 220 together may obtain a generator for generating a fake which is indistinguishable from real data.

The apparatus 1 for inspecting a vehicle 2 according to various exemplary embodiments of the present disclosure may generate a defect image 430 using a GAN model, in which the defect image 430 is described in relation to a water leak and oil leak as an exemplary embodiment of the present disclosure, but may include any other defect which may be generated in a portion of the vehicle 2, such as a crack.

Furthermore, the GAN model used in the apparatus 1 for inspecting the vehicle 2 according to various exemplary embodiments of the present disclosure may adopt a Pix2Pix model, but the first learning model 200 may be provided using any other model as long as it can perform training by processing an image, such as Cycle-GAN.

The server 170 may construct the first learning model 200 to generate a plurality of defect images 430 by use of a virtual image 410, in which a defect is indicated, of a reference lower image 400 of the vehicle 2, and a reference defect image 420 as an input value thereof.

That is, the server 170 may use, as an input value thereof, a reference lower image 400 having no defect in the lower side of the vehicle 2 and a virtual image 410, which is a virtual defect image 430 obtained by indicating a defect, such as water leak or leak, in the reference lower image 400 of the corresponding vehicle type, to construct the first learning model 200.

The first learning model 200 may input the virtual image 410 to the generator 210 and output the defect image 430 from the generator 210. The generator 210 may deform the virtual image 410 so that the discriminator 220 determines the virtual image 410 as an actual defect image 430, by use of the virtual image 410, in which a person directly indicates the water leak or oil leak point, without using actual water leak or oil leak data.

As a result, when the discriminator 220 fails to distinguish the virtual image 410 generated by the generator 210 from the reference defect image 420, which is actual water leak or oil leak data, the output of the generator 210 may be used as training data for constructing for the second learning model 300.

Accordingly, the first learning model 200 may generate training data for training the second learning model 300, and because the generated defect image 430, which is the training data, is indistinguishable from a reference defect image 420, that is, actual water leak or oil leak data, the performance of the second learning model 300 is improved.

That is, in the convention technology, a person directly labels or AI is used to obtain a new defect image 430, but droplets by water leak or oil leak are displayed at random locations, resulting in low reliability.

However, with the apparatus of inspecting a vehicle according to an exemplary embodiment of the present disclosure, water droplets may be displayed at a location desired by a user, and even when water droplets are indicated by a user in a two-dimensional shape, an image indistinguishable from actual water droplets is generated, and thus all the limitations of the conventional technology are eliminated.

The second learning model 300 may be a deep learning model similar to the first learning model 200, and may use any type of algorithm configured for analyzing an image and verifying a defect image 430.

For example, the second learning model 300 may be a convolution neural network (CNN) algorithm, and the CNN algorithm is a type of deep learning algorithm that receives a certain image as an input value thereof, and converts the input value into an output value that identifies an object.

The CNN algorithm may be used to, even when there is a change in the shape of an input value that represents the same output value, derive the same output value by deriving the characteristics representing the image.

In the method of inspecting a vehicle 2 according to an exemplary embodiment of the present disclosure, the defect image 430 is generated by the first learning model 200, and thus all input values are different, and the degree of shape deformation may be great depending on the first learning model 200.

Accordingly, the processor 130 may use a CNN algorithm to provide high reliability even when there is a deformation in the defect image 430.

The CNN used in the method of inspecting a vehicle 2 according to various exemplary embodiments of the present disclosure may include at least one convolutional layer, at least one pooling layer, a fully connected layer, and an output value.

The convolutional layer may have a layer depth determined according to the designer of the algorithm. The convolutional layer may have defect data, which is an output value of the first learning model 200, as an input value thereof and apply a weight to the input value to determine a feature map.

Similar to a convolutional layer, a pooling layer may have a layer depth determined according to the designer.

The pooling layer may reduce the size of the feature map of the at least one convolutional layer through subsampling. As the pooling layer reduces the size of the feature map, the number of parameters to be learned by the network may be reduced so that the output may be simplified.

The fully connected layer may be connected to all activations of the pooling layer.

CNN may use the output value of the fully connected layer to estimate whether an input lower image is defective.

Next, an exemplary embodiment in which the defect image 430 is generated by the first learning model 200 will be described.

Figure 5A:
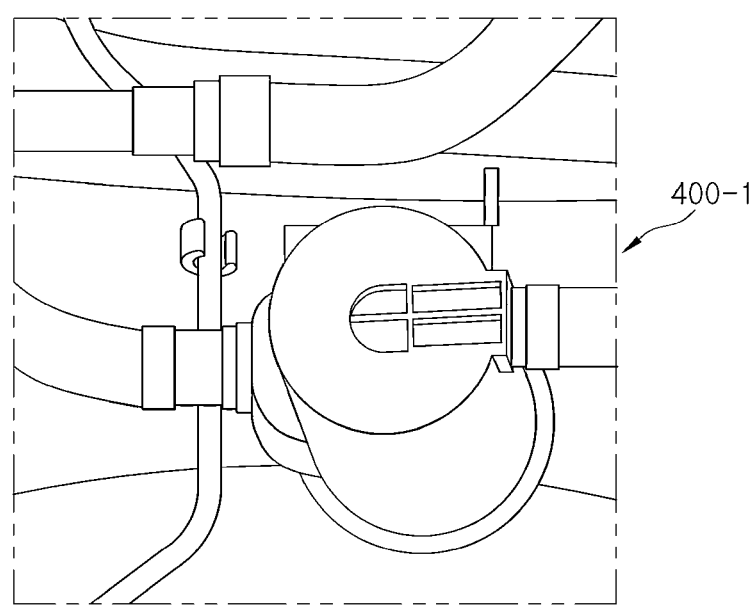
FIG. 5A is a diagram illustrating a reference lower image of a vehicle according to an exemplary embodiment of the present disclosure.
Figure 5B:
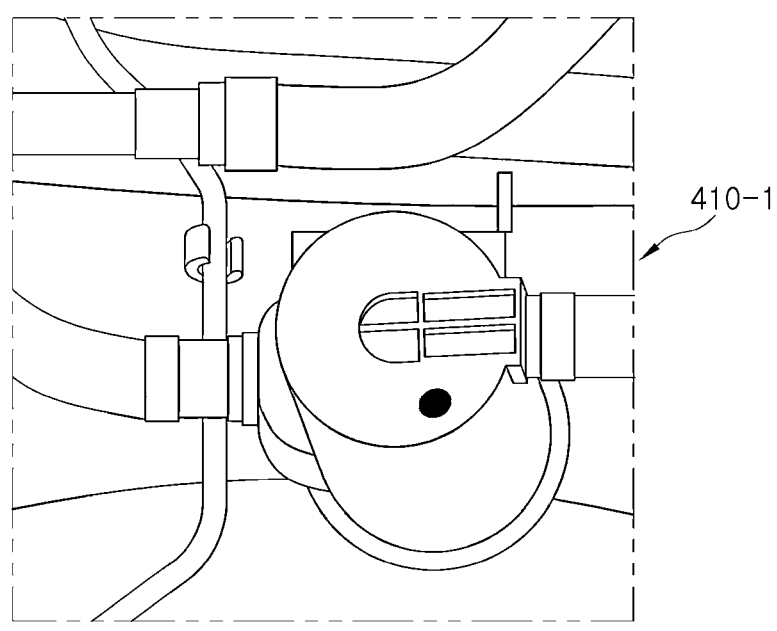
FIG. 5B is a diagram illustrating an example of a virtual image.
Figure 6A:
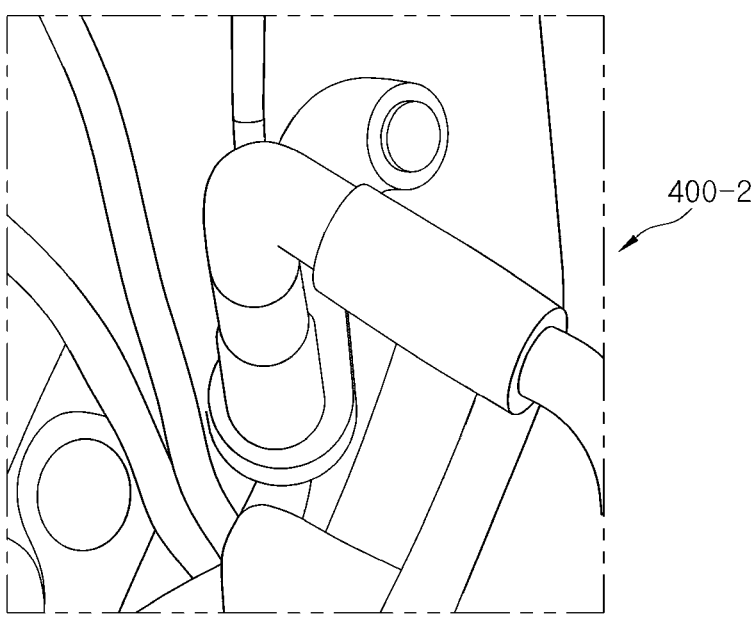
FIG. 6A is a diagram illustrating a reference lower image of a vehicle according to another exemplary embodiment of the present disclosure.
Figure 6B:
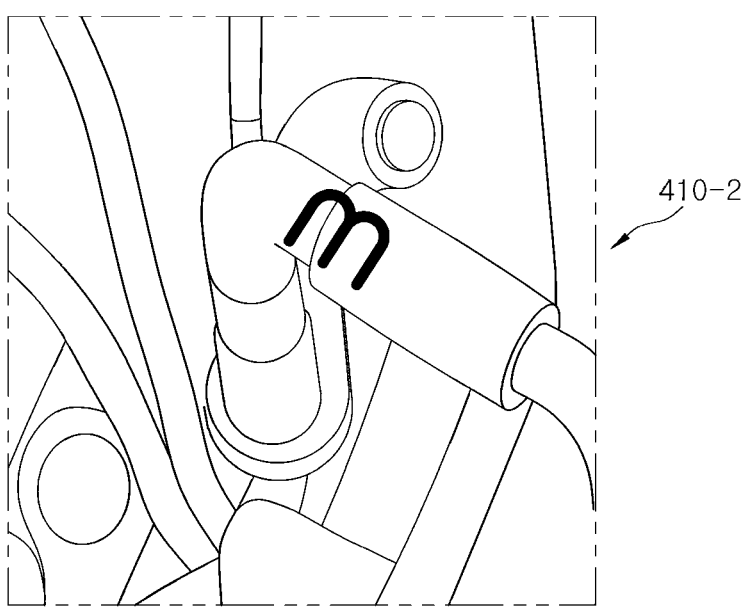
FIG. 6B is a diagram illustrating an example of a virtual image.

FIG. 5A is a diagram illustrating a reference lower image 400-1 of a vehicle 2 according to an exemplary embodiment of the present disclosure, and FIG. 5B is a diagram illustrating an example of a virtual image 410-1. FIG. 6A is a diagram illustrating a reference lower image 400-2 of a vehicle 2 according to another exemplary embodiment of the present disclosure, and FIG. 6B is a diagram illustrating an example of a virtual image 410-2.

In FIG. 5A, parts of the lower side of the vehicle 2 according to an exemplary embodiment are illustrated, and in FIG. 6A, other parts of the lower side of the vehicle 2 are illustrated.

In the instant case, FIGS. 5A and 6A illustrate reference lower images 400-1 and 400-2 of the vehicle 2 that are images in a normal state without defects in the lower side of the vehicle 2. Such a reference lower image 400 may be used to generate a defect image 430 as will be described below.

FIG. 5B shows a virtual image 410-1 obtained by indicating an arbitrary defect in the reference lower image 400-1. Furthermore, FIG. 6B shows another virtual image 410-2 obtained by indicating an arbitrary defect in the reference lower image 400-2.

As shown in FIGS. 5B and 6B, the user may directly indicate a water droplet in a desired size and shape at a desired location, and it may be assumed that a water droplet is caused by water leak or oil leak.

That is, the first learning model 200 may generate a water droplet in a circle shape as shown in FIG. 5B or in a letter of the alphabet 'm' as shown in FIG. 6B.

Figure 7A:
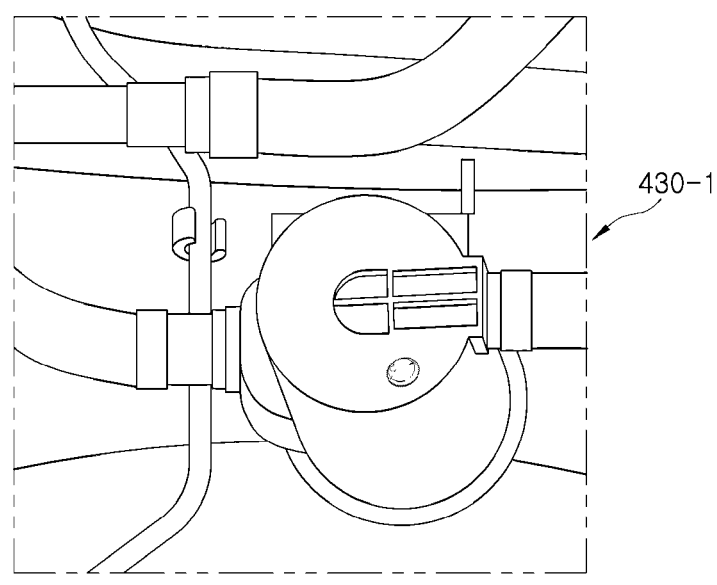
FIG. 7A and FIG. 7B are diagrams illustrating defect images generated by an apparatus of inspecting a vehicle according to an exemplary embodiment of the present disclosure.
Figure 7B:
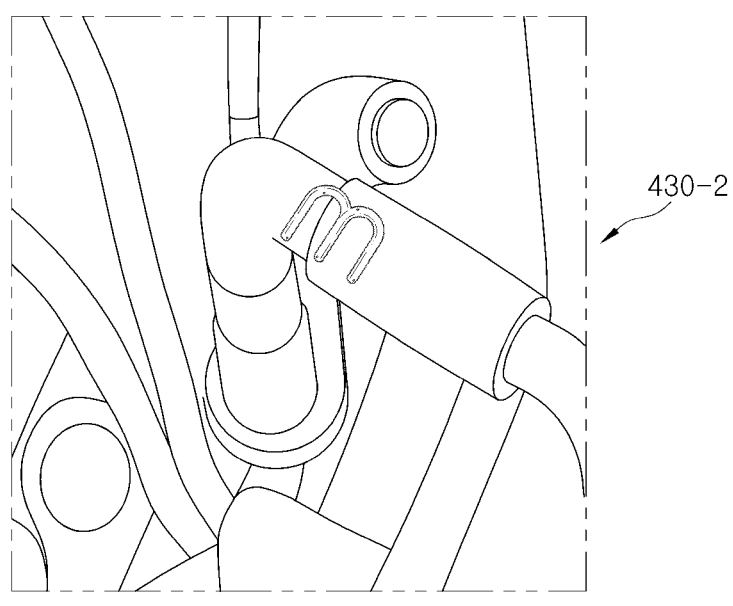

FIG. 7A and FIG. 7B are diagrams illustrating defect images 430-1 and 430-2 generated by an apparatus 1 for inspecting a vehicle 2 according to an exemplary embodiment of the present disclosure.

FIG. 7A shows a water droplet generated in a circle shape, and FIG. 7B showing a water droplet generated in a letter of the alphabet 'm'.

As described above, the apparatus 1 for inspecting the vehicle 2 according to various exemplary embodiments of the present disclosure may train the second learning model 300 using the defect image 430 generated by the first learning model 200, and the second learning model 300 may be provided with a high reliability by use of various input values.

Accordingly, the reliability of the acquisition of the inspection result data by the second learning model 300 may be improved.

Furthermore, as described above, even when there are a small number of defective patterns, a defect image 430 in a shape similar to an actual defect may be generated at a specific location designated by the user or a location similar to a previous pattern, and by use of the generated defect image 430, the learning model for detecting a defect may be provided with an improved performance.

Figure 8:
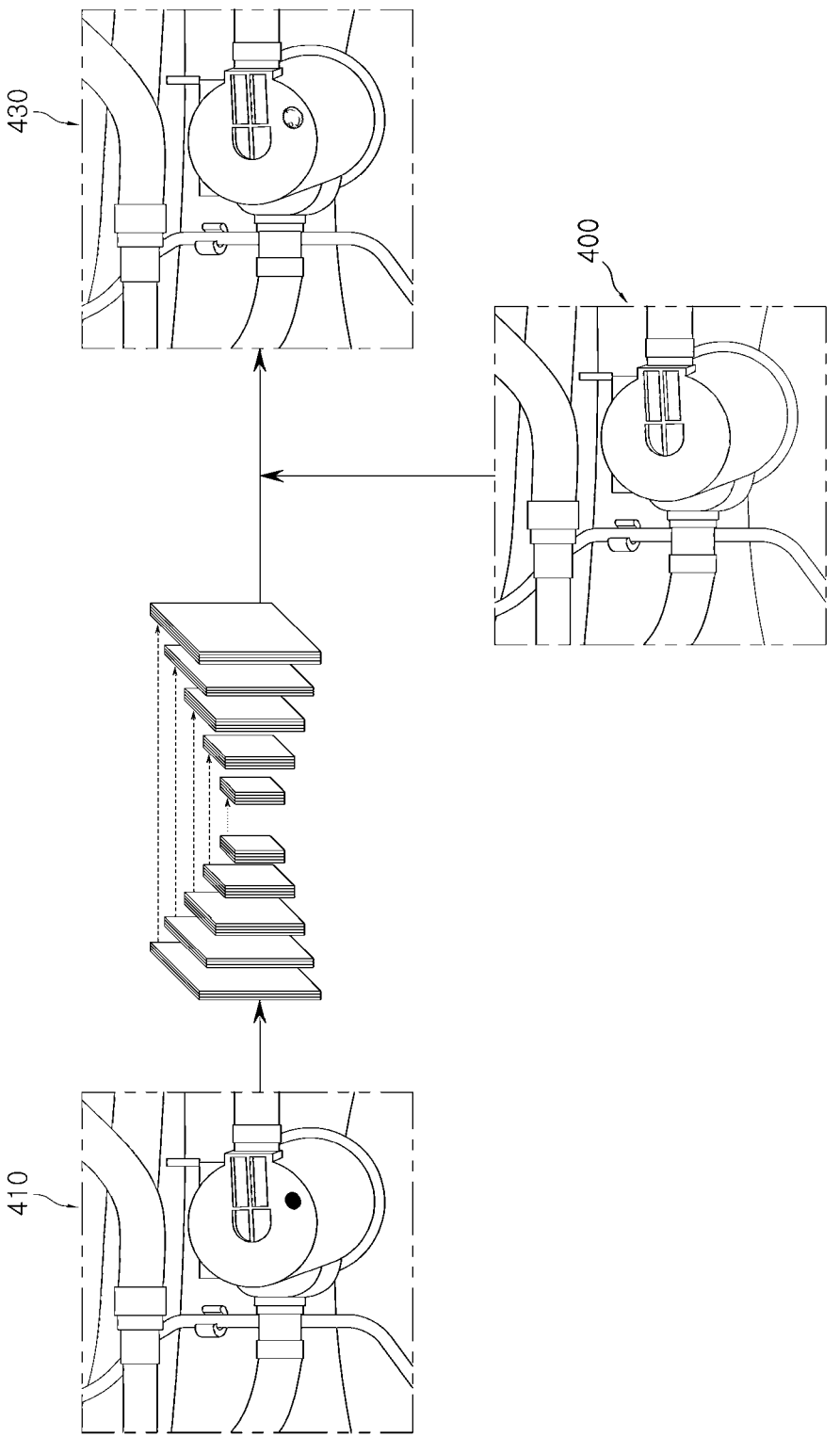
FIG. 8 is a diagram illustrating a process in which a defect image is generated by a generative adversarial network (GAN).

FIG. 8 is a diagram illustrating a process in which a defect image 430 is generated by a GAN.

The first learning model 200 may receive a virtual image 410 and analyze the virtual image 410 to output a defect image 430 similar to an actual water droplet image.

In the instant case, the first learning model 200 may output an output value by the GAN algorithm as it is, but may synthesize a reference lower image 400 of the vehicle 2 with an intermediate output value immediately before being output.

Accordingly, the first learning model 200 may determine that an image except for a water droplet generation part in the first learning model 200 is not changed, and thus the GAN model may focus on the water droplet generation part. In the instant case, the reference lower image 400 added to the intermediate output value may represent an RGB image in which masking and water drop labeling are not performed.

In the apparatus of inspecting a vehicle 1 according to an exemplary embodiment of the present disclosure, when a user indicates a water droplet generation part, a portion of the original image corresponding to the of the water droplet generation part may be occluded by the user's labeling.

The occluded original image may be deformed or damaged to be different from the actual image of the lower side of the vehicle in the repeated learning process of the generator 210 and the discriminator 220.

Because the final output value is a transparent water droplet, the damage to the original image of the droplet generation position may lower the reliability of the second learning model 300.

When the reliability of the second learning model 300 is lowered, the apparatus of inspecting a vehicle 1 according to various exemplary embodiments of the present disclosure may not detect a water leak in the vehicle 2.

To solve the above described limitations, the first learning model 200 may synthesize the reference lower image 400 of the vehicle 2 with the intermediate output value immediately before being output.

Because the RGB image maintains the original form of the droplet generation part, which is a part indicated by the user, the original image of the droplet generation position may be maintained the same as the original form while the droplet is output to be transparent in the final output value.

As a result, the first learning model 200 may change the image by focusing only on the deformation of the water droplet generation part, which is a part indicated by the user, and because the image except for the generated water droplet is not changed, the defect image 430 may be more reliably and efficiently generated.

Figure 9A:
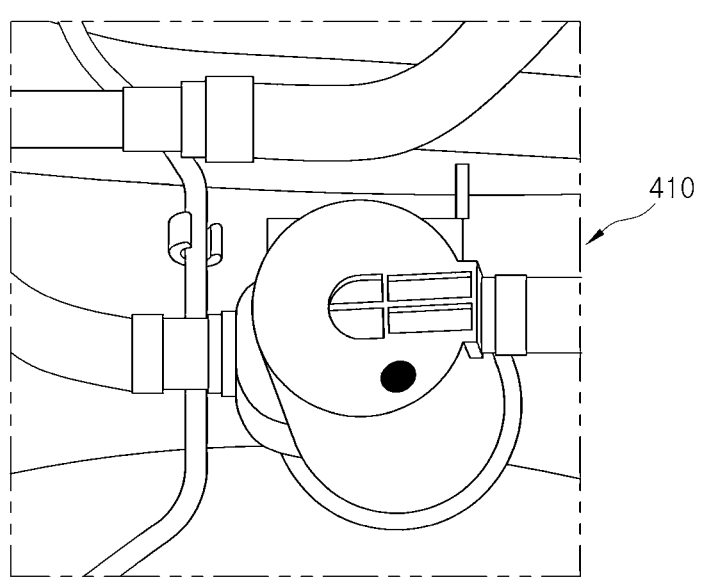
FIG. 9A and FIG. 9B are diagrams illustrating an example of a masking image used in an apparatus of inspecting a vehicle according to an exemplary embodiment of the present disclosure.
Figure 9B:
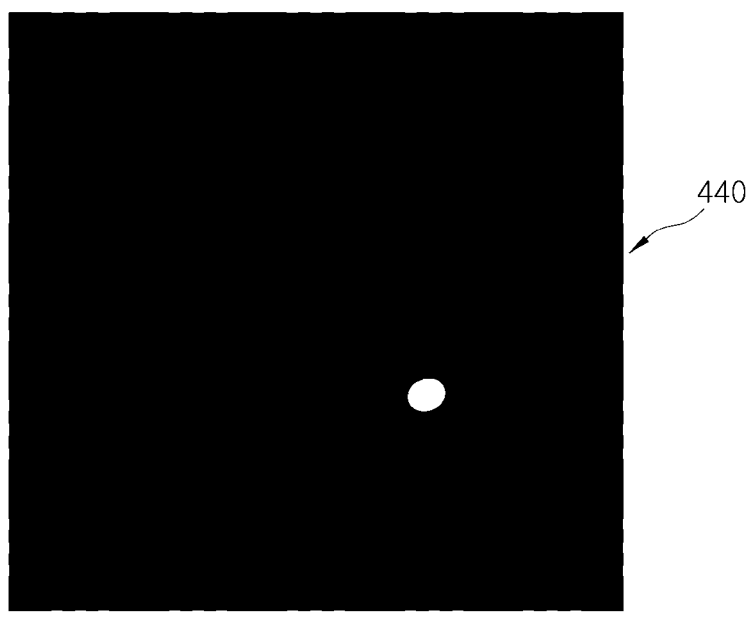

FIG. 9A and FIG. 9B are diagrams illustrating an example of a masking image 440 used in an apparatus 1 for inspecting a vehicle 2 according to an exemplary embodiment of the present disclosure.

The first learning model 200 may be constructed to use a masking image 440 in addition to the virtual image 410 and the reference defect image 420 as an input value thereof, to generate a plurality of defect images 430.

Here, the masking image 440 may refer to an image in which a portion except for the water droplet generation part indicated by the user is processed to have a single color as shown in FIG. 9A and FIG. 9B.

Similar to FIG. 8, the first learning model 200 may use the masking image 440 to change the image by focusing only on the deformation of the water droplet generation part, which is a portion indicated by the user, and thus the defect image 430 may be efficiently generated.

Furthermore, the first learning model 200 may use the reference lower image 400 together with the masking image 440 as an input value thereof, to prevent loss of the original image of the water droplet generation part indicated by the user.

That is, when the inspection apparatus is used for water leak or oil leak inspection, a defective portion may be transparent or translucent due to liquid. When the image of the corresponding portion is lost by a deep learning result in the first learning model 200, the second learning model 300 may have a lowered reliability from using the defect image as an input value thereof. However, according to the present disclosure, the image loss may be prevented.

Figure 10:
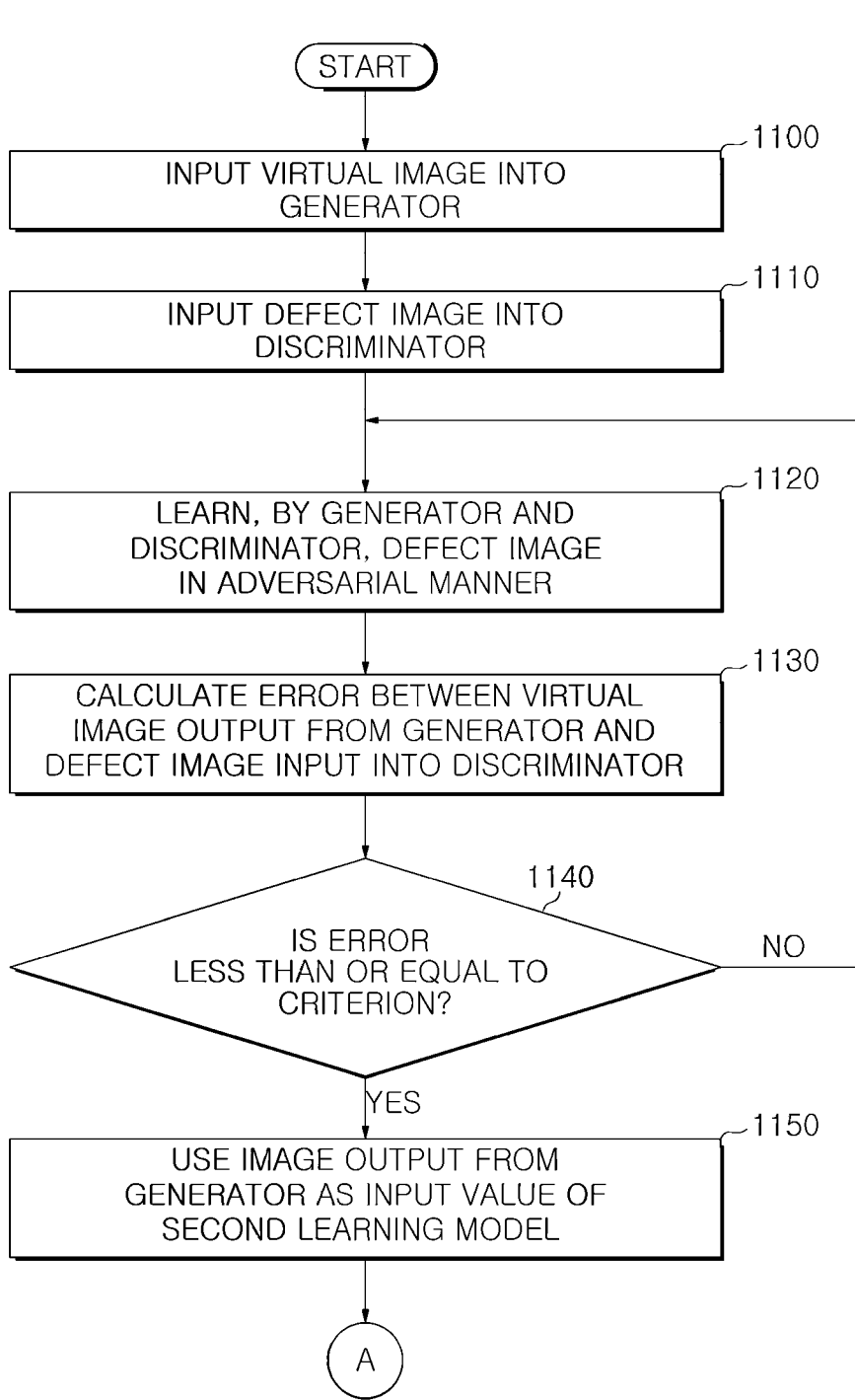
FIG. 10 is a flowchart showing a procedure for generating a defect image by a first learning model of an apparatus of inspecting a vehicle according to an exemplary embodiment of the present disclosure.
Figure 11:
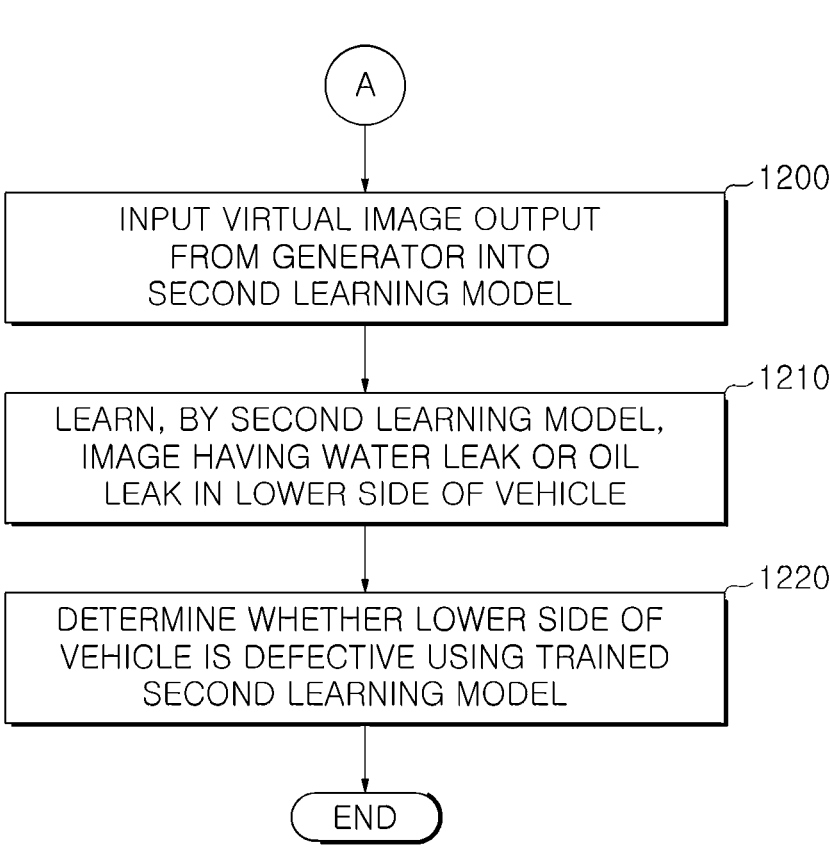
FIG. 11 is a flowchart showing a procedure for detecting a defect in a lower side of a vehicle by a second learning model of an apparatus of inspecting a vehicle according to an exemplary embodiment of the present disclosure.

FIG. 10 is a flowchart showing a procedure for generating a defect image 430 by a first learning model 200 of an apparatus 1 for inspecting a vehicle 2 according to an exemplary embodiment of the present disclosure, and FIG. 11 is a flowchart showing a procedure for detecting a defect in a lower side of a vehicle 2 by a second learning model 300 of an apparatus 1 for inspecting a vehicle 2 according to an exemplary embodiment of the present disclosure.

Referring to FIG. 10, the first learning model 200 may receive a virtual image 410, in which a defect is indicated, of a reference lower image 400 of the vehicle 2 as an input to the generator 210 (1100). In the instant case, the first learning model 200 may use all of the virtual image 410, the reference lower image 400, and the masking image 440 as input values to increase reliability.

The first learning model 200 may receive a defect image 430, which is actual water or oil leak data, as an input to the discriminator 220 (1110). Accordingly, the discriminator 220 may be trained with the actual defect image 430, which is a generation target of the first learning model 200, and may discriminate the output value of the first learning model 200.

The discriminator 220 may determine the degree to which the defect image 430, which is an output value of the first learning model 200, is similar to the reference defect image 420, and the generator 210 may learn the result of the determination of the discriminator 220 and perform adversarial learning with the discriminator 220 to increase the degree of similarity (1120).

The discriminator 220 may determine an error between the image output from the generator 210 and the reference defect image 420 input to the discriminator 220 (1130), and the generator 210 may generate the defect image 430 by deforming the virtual image 410 so that the error is reduced. Accordingly, when the error is less than or equal to the criterion (YES in operation 1140), it may be determined that the image is similar enough for the output value of the first learning model 200 to be used as an input value of the second learning model 300.

The first learning model 200 may use the image output from the generator 210 as an input value of the second learning model 300 when the error is less than or equal to a preset criterion (1150).

Referring again to FIG. 11, the first learning model 200 may input the image output from the generator 210 to the second learning model 300 (1200).

That is, the second learning model 300 may learn an image including a water or oil on the lower side the vehicle 2 using the defect image 430, which is an output value of the first learning model 200 (1210). Furthermore, because training data may be generated even in a process in which the defective rate is low, the utilization of artificial intelligence may significantly increase.

Thereafter, the method of inspecting a vehicle 2 according to various exemplary embodiments of the present disclosure may determine whether the lower side of the vehicle 2 is defective using the second learning model 300 which is completed with training (1220).

Figure 12:
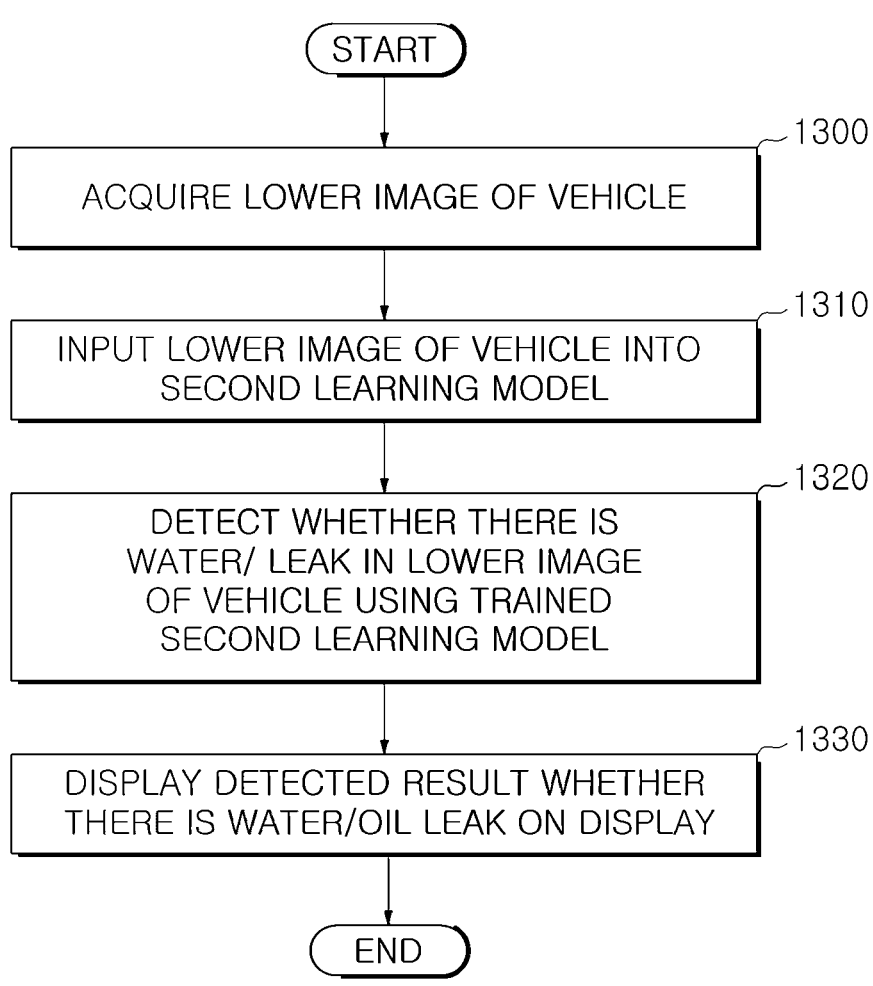
FIG. 12 is a general flowchart showing an example of detecting whether a defect exists in a lower side of a vehicle.

FIG. 12 is a general flowchart showing an example of detecting whether a defect exists in a lower side of a vehicle 2.

In the above procedure, as the first learning model 200 and the second learning model 300 are trained in an adversarial manner and constructed, whether there is a water or oil leak defect in the lower image of the vehicle 2 may be determined.

When the vehicle 2 enters a specific location of the apparatus of inspecting a vehicle, the first camera 110 and the second camera 120 may be used to obtain a lower image suitable for the vehicle type of the vehicle 2 (1300).

The apparatus of inspecting a vehicle may transmit the lower image of the vehicle 2 to the server 170, and the server 170 may input the lower image of the vehicle 2 into the constructed second learning model 300 (1310).

Thereafter, the server 170 may detect whether there is a water leak or oil leak in the lower image of the vehicle 2 using the trained second learning model 300 (1320).

The apparatus of inspecting a vehicle according to various exemplary embodiments of the present disclosure may receive, from the server 170, inspection result data corresponding to whether there is a water leak or oil leak, and may display the received inspection result data on the display 150 (1330).

According to the present disclosure as described above, an inspection of whether the lower side of the vehicle 2 is defective, which has a difficulty in using an AI model learning due to a low rate of defects in the lower side of the vehicle 2, may be performed using an AI model so that an efficient inspection is performed in terms of time and cost.

As is apparent from the above, according to one aspect of the included disclosure, the method and apparatus of inspecting a vehicle can prevent a side effect from occurring due to using manpower for vehicle inspection and also enable efficient inspection, by use of an artificial intelligence (AI) model for inspecting a defect on a lower side of a vehicle, even when there is a difficulty in training an AI model with a low rate of defects on the lower side of the vehicle.

According to one aspect of the present disclosure, the method and apparatus of inspecting a vehicle can generate a defect image including a similar shape as an actual defect at a position designated by a user or a position similar to that of a previous pattern even with a small number of defect patterns, and use the generated defect image for improving the performance a learning model for detecting a defect.

In various exemplary embodiments of the present disclosure, the scope of the present disclosure includes software or machine-executable commands (e.g., an operating system, an application, firmware, a program, etc.) for facilitating operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A method of inspecting a vehicle, the method comprising:

photographing a lower side of the vehicle to obtain a lower side image of the vehicle;

transmitting the obtained lower side image to a server;

receiving inspection result data of the lower side of the vehicle from the server; and displaying the inspection result data on a display, wherein the received inspection result data includes a result obtained by generating a defect image of the lower side of the vehicle from a virtual image, in which a location of defect is indicated by a user, on a reference lower image of the vehicle that does not include a defect, and determining whether the lower side of the vehicle is defective based on the lower side image by using the generated defect image.

2. The method of claim 1, wherein the inspection result data includes a result obtained by:

constructing a first learning model for generating a plurality of defect images using the virtual image and a reference defect image as an input value thereof;

constructing a second learning model for determining whether the lower side of the vehicle is defective using the plurality of defect images from the first learning model as an input value thereof; and determining whether the lower side of the vehicle is defective using the second learning model.

3. The method of claim 2, wherein the constructing of the first learning model includes:

using a masking image as an input value thereof in addition to the virtual image and the reference defect image, to construct the first learning model so that the plurality of defect images are generated.

4. The method of claim 3, further including synthesizing the reference lower image with an output value output from the first learning model using the virtual image, the reference defect image, and the masking image as an input value thereof, to correct the plurality of defect images.

5. The method of claim 4, wherein the reference lower image synthesized with the output value includes an RGB image, which is an original image of the lower side of the vehicle.

6. The method of claim 2, wherein the first learning model includes a generative adversarial network (GAN), and wherein the constructing of the first learning model includes inputting the virtual image to a generator and inputting the reference defect image to a discriminator, so that the plurality of defect images are generated.

7. The method of claim 6, wherein the generating of the plurality of defect images includes:

deforming, by the generator, the virtual image based on an error between the virtual image output from the generator and the reference defect image input to the discriminator, to generate the plurality of defect images.

8. The method of claim 7, wherein the generating of the plurality of defect images includes:

deforming, by the generator, the virtual image so that the error decreases, to generate the plurality of defect images.

9. The method of claim 8, wherein the constructing of the second learning model includes:

based on the error being less than or equal to a preset criterion, constructing the second learning model using a defect image generated by the generator as an input value of the second learning model.

10. The method of claim 9, wherein the determining of whether the lower side of the vehicle is defective includes:

inputting a photographed lower image of the vehicle to the constructed second learning model, and determining whether the lower side of the vehicle is defective based on an output of the constructed second learning model.

11. An apparatus of inspecting a vehicle, the apparatus comprising:

a communicator;

a camera configured to photograph a lower side of the vehicle;

a display; and at least one processor configured to receive inspection result data including whether the lower side of the vehicle is defective from a server through the communicator and display the inspection result data on the display, wherein the received inspection result data includes a result obtained by generating a defect image from a virtual image, in which a location of defect is indicated by a user, on a reference lower image of the vehicle that does not include a defect, and determine whether the lower side of the vehicle is defective based on a lower side image by using the generated defect image.

12. The apparatus of claim 11, wherein the received inspection result data includes a result obtained by:

constructing a first learning model for generating a plurality of defect images using the virtual image and a reference defect image as an input value thereof;

constructing a second learning model for determining whether the lower side of the vehicle is defective using the plurality of defect images from the first learning model as an input value thereof; and determining whether the lower side of the vehicle is defective using the second learning model.

13. The apparatus of claim 12, wherein the first learning model is constructed by use of a masking image as an input value thereof in addition to the virtual image and the reference defect image, to generate the plurality of defect images.

14. The apparatus of claim 13, wherein the plurality of defect images are corrected by synthesizing the reference lower image with an output value output from the first learning model using the virtual image, the reference defect image, and the masking image as an input value thereof.

15. The apparatus of claim 14, wherein the reference lower image synthesized with the output value includes an RGB image, which is an original image of the lower side of the vehicle.

16. The apparatus of claim 12,
wherein the first learning model includes a generative adversarial network (GAN) algorithm to output an output value of the first learning model, and
wherein the first learning model is constructed by inputting the virtual image to a generator and inputting the reference defect image to a discriminator, to generate the plurality of defect images.

17. The apparatus of claim 16, wherein the plurality of defect images are generated by controlling the generator to deform the virtual image based on an error between the virtual image output from the generator and the reference defect image input to the discriminator.

18. The apparatus of claim 17, wherein the plurality of defect images are generated by allowing the generator to deform the virtual image so that the error decreases.

19. The apparatus of claim 18, wherein the second learning model is constructed using a virtual image generated by the generator as an input value of the second learning model based on the error being less than or equal to a preset criterion.

20. The apparatus of claim 19, wherein the inspection result data is obtained by inputting a lower image of the vehicle photographed by the camera to the constructed second learning model, and determining whether the lower side of the vehicle is defective based on an output of the constructed second learning model.

21. An electronic apparatus comprising:
a memory; and
at least one processor configured to generate inspection result data by generating a defect image from a virtual image, in which a location of defect is indicated by user, on a reference lower image of a vehicle that does not include a defect and determining whether a lower side of the vehicle is defective based on a lower side image by using the generated defect image, and to selectively store the inspection result data, in the memory.

22. The electronic apparatus of claim 21, wherein the at least one processor is configured to:
construct a first learning model for generating a plurality of defect images using the virtual image and a reference defect image as an input value thereof;
construct a second learning model for determining whether the lower side of the vehicle is defective using the plurality of defect images from the first learning model as an input value thereof; and
determine whether the lower side of the vehicle is defective using the second learning model.

23. The electronic apparatus of claim 22, wherein the at least one processor is configured to construct the first learning model by use of a masking image as an input value thereof in addition to the virtual image and the reference defect image, to generate the plurality of defect images.

24. The electronic apparatus of claim 23, wherein the at least one processor is configured to correct the plurality of defect images by synthesizing the reference lower image with an output value output from the first learning model using the virtual image, the reference defect image, and the masking image as an input value thereof.

25. The electronic apparatus of claim 24, wherein the reference lower image synthesized with the output value includes an RGB image, which is an original image of the lower side of the vehicle.

26. The electronic apparatus of claim 22,
wherein the first learning model includes a generative adversarial network (GAN), and
wherein the at least one processor is configured to generate the plurality of defect images by inputting the virtual image to a generator and inputting the reference defect image to a discriminator.

27. The electronic apparatus of claim 26, wherein the at least one processor is configured to generate the plurality of defect images by controlling the generator to deform the virtual image based on an error between the virtual image output from the generator and the reference defect image input to the discriminator.

28. The electronic apparatus of claim 27, wherein the at least processor is configured to generate the plurality of defect images by controlling the generator to deform the virtual image so that the error decreases.

29. The electronic apparatus of claim 28, wherein the at least one processor is configured to construct the second learning model using a virtual image generated by the generator as an input value of the second learning model based on the error being less than or equal to a preset criterion.

30. The electronic apparatus of claim 29, wherein the at least one processor is configured to input a lower image of the vehicle to the constructed second learning model, and to determine whether the lower side of the vehicle is defective based on an output of the constructed second learning model.

31. A method of detecting a defect of object in an image, the method comprising:
constructing a first learning model for generating a plurality of defect images using a virtual image, in which a location of a defect is indicated by a user, of on a reference lower image of a vehicle that does not include a defect, and a reference defect image as an input value thereof;
constructing a second learning model for determining whether the object is defective using the plurality of defect images from the first learning model as an input value thereof; and
determining whether the object is defective using the second learning model.

32. The method of claim 31, wherein the first learning model includes a generative adversarial network (GAN), and
wherein the constructing of the first learning model includes inputting the virtual image to a generator and inputting the reference defect image to a discriminator, so that the plurality of defect images are generated.

33. The method of claim 32, wherein the generating of the plurality of defect images includes:
deforming, by the generator, the virtual image based on an error between the virtual image output from the generator and the reference defect image input to the discriminator, to generate the plurality of defect images.

34. The method of claim 33, wherein the generating of the plurality of defect images includes:

deforming, by the generator, the virtual image so that the error decreases, to generate the plurality of defect images.

35. The method of claim 34, wherein the constructing of the second learning model includes:

based on the error being less than or equal to a preset criterion, constructing the second learning model using a defect image generated by the generator as an input value of the second learning model.

* * * * *